United States Patent

Belluteau et al.

[11] Patent Number: 4,678,558
[45] Date of Patent: Jul. 7, 1987

[54] METHOD USABLE IN PARTICULAR FOR WASHING AND DESORBING SOLID PRODUCTS CONTAINING HYDROCARBONS

[75] Inventors: Jean-Pierre Belluteau, Noisy le Rio; Christian Bocard, Orgeval; Christian Such, Orsay; Daniel Vaillant, Antony, all of France

[73] Assignees: Institut Francais du Petrole, Rueil-Malmaison; Laboratoire Central des Ponts et Chausses, Paris, both of France

[21] Appl. No.: 751,589

[22] Filed: Jul. 3, 1985

[30] Foreign Application Priority Data

Jul. 4, 1984 [FR] France ............................ 84 10730

[51] Int. Cl.⁴ .............................................. C10G 1/04
[52] U.S. Cl. .................................................. 208/390
[58] Field of Search .......................... 208/11 LE, 390; 423/340; 210/922, 925; 241/16

[56] References Cited

U.S. PATENT DOCUMENTS

| 3,152,979 | 10/1964 | Bichard et al. | 208/390 |
| 3,282,416 | 11/1966 | Coke | 423/340 |
| 3,547,803 | 12/1973 | Barkman, Jr. et al. | 208/390 |
| 3,660,268 | 5/1972 | Kelly et al. | 208/390 |
| 3,764,008 | 10/1973 | Darley et al. | 208/390 |
| 4,120,775 | 10/1978 | Murray et al. | 208/11 LE |
| 4,229,281 | 10/1980 | Alquist et al. | 208/11 LE |
| 4,392,949 | 7/1983 | Kruyer | 208/11 LE |
| 4,462,892 | 7/1984 | Schramm et al. | 208/11 LE |
| 4,514,305 | 4/1985 | Filby | 208/11 LE |
| 4,533,459 | 8/1985 | Dente et al. | 208/11 LE |

Primary Examiner—Andrew H. Metz
Assistant Examiner—Glenn Caldarola
Attorney, Agent, or Firm—Antonelli, Terry & Wands

[57] ABSTRACT

A method and a device usable in particular for washing solid products contaminated by hydrocarbons.

According to this method, a desorbent liquid phase is used to wash solid products which are brought into contact with this desorbent liquid phase forming a mixture consisting of solution, desorbed hydrocarbons and washed products. Said mixture, freed from gravel, undergoes at least one separation stage, this separation giving a underflow comprising at least the major part of the washed sand and an overflow from which the hydrocarbons and the aqueous phase are recovered.

This method is applicable to de-oiling oil-contaminated sands and gravels.

11 Claims, 1 Drawing Figure

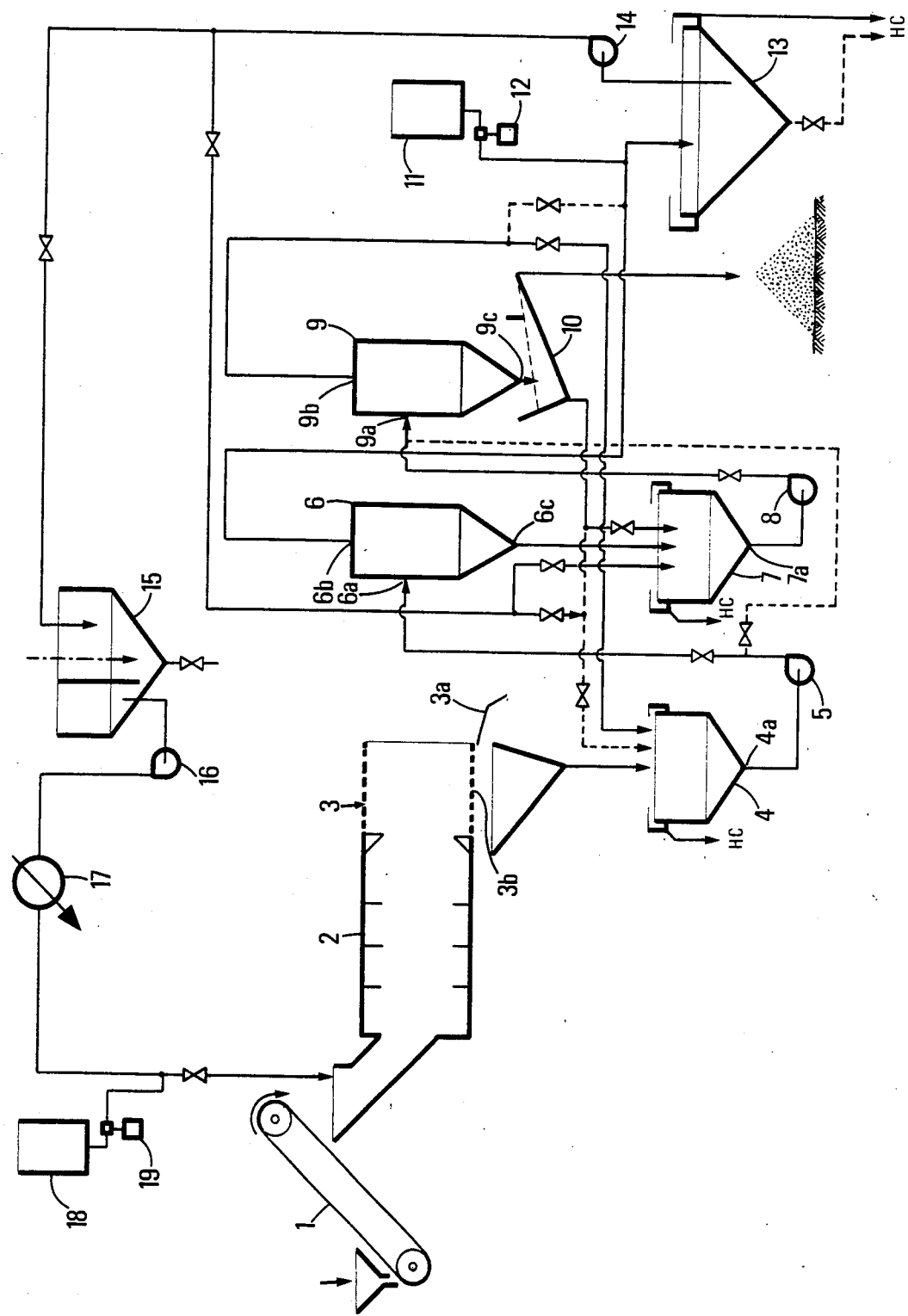

METHOD USABLE IN PARTICULAR FOR WASHING AND DESORBING SOLID PRODUCTS CONTAINING HYDROCARBONS

This invention relates to a method and a device usable in particular for de-oiling sands and gravels contaminated by hydrocarbons. The method can be applied in industrial scale treatment with the object of extracting heavy hydrocarbons, for example, from bituminous sands, and washing solid products impregnated with undesirable substances, such as washing sands and sediments contaminated by hydrocarbons either chronically or following accidental spillage of petroleum products resulting into the contamination of sand beaches.

In the last case, in particular, the method according to the invention can be used in a transportable plant on a mobile platform used on the site itself. In the plant, the contaminated sand is brought into contact with a liquid dissolving the hydrocarbons or promoting their desorption from the sand.

Various methods for attaining such an objective have been described before. For example a combination of an attrition cell and a flotation cell to clean beaches contaminated by hydrocarbons ("Froth flotation cleanup of oil-contaminated beaches", G. D. GUMTZ, T. P. MELOY, Proceedings of the Conference on Prevention and Control of Oil Spills, American Petroleum Institute, Washington D.C., 1971).

U.S. Pat. No. 4,132,010 describes a mobile sand-washing apparatus consisting of a perforated platform whose movement causes the displacement of a layer of sand subjected to jets of steam entraining the hydrocarbons.

Other patents describe systems for recovering hydrocarbon residues from bituminous sands by means, for example, of an attrition cell in which the hydrocarbons are extracted with a solvent (U.S. Pat. No. 4,096,057) or by using an abrasion cell containing water with addition of solvent, in which the sand circulates vertically (U.S. Pat. No. 4,110,195).

Yet another technique consists in washing hydrocarbon-contaminated coarse sand and gravels in which the contaminated material is pre-mixed with kerosene in a concrete mixer type unit and then the premix is passed into an endless screw. It is there that the water washing is made and the solid and liquid phases are separated ("The Warren Spring Laboratory beach material washing plant for shoreline clean-up", P. R. MORRIS, D. TOOKEY, T. WALSH, Proceedings of the 1983 Oil Spill Conference, American Petroleum Institute, Washington D.C. 1983). However, this prior method cannot be used for treating fine sands.

To illustrate the prior art Patent Nos. EP-A-34896, CA-A-1152918, CA-A-970310 and GB-A-2084179 also are cited.

The problems remaining to be resolved are the following:

A washing method must be capable of treating all types of sediment consisting for example of gravels and sands, in particular fine sands, contaminated by hydrocarbons including those freshly contaminated or having aged, that is, having undergone an oxidation process, and which are strongly adsorbed on a mineral substrate. However, the plant using the process must be easily erected, be transportable and capable of continuously washing and desorbing contaminated sediments. This is the object of this invention.

The present invention relates to a method usable for washing solid products consisting of a mixture of heterogeneous grain size impregnated with undesirable substances, such as a mixture of sand and gravel containing hydrocarbons, comprising washing these products with a liquid phase capable of desorbing these hydrocarbons; in addition, this method comprises a combination of the following stages:

(a) the solid products to be washed are brought into contact with a liquid an aqueous liquid containing a desorbent solution to form a mixture consisting of solution, desorbed hydrocarbons and washed products, (b) washed gravels, when present are removed from the mixture, (c) the mixture freed from gravel is made to undergo at least one separate stage, notably by cycloning, which provides an overflow comprising at least the major part of the hydrocarbons and an underflow comprising at least the major part of the washed sand and, (d) the overflow is separated by decantation and the hydrocarbons and and an aqueous phase are recovered and the sand being cleaned in part of the undesirable substances is recuperated.

It can be advantageous to subject the underflow of stage (c) to a second separation stage in particular by cycloning and in that case a second overflow is collected and reintroduced with the mixture resulting from stage (b), as well as a second underflow from which are recovered the washed and a de-oiled aqueous phase, which is added to the underflow from stage (c).

In addition, it is possible to pass the mixture obtained in stage (b) into a first tank where it is diluted by at least a part of the underflow from stage (c), and/or by at least a part of the overflow and/or by a least a part of the aqueous phase from stage (d).

In addition, the underflow from stage (c) can pass into a second tank where it is diluted with at least a part of the de-oiled water from the second underflow and/or at least part of the aqueous phase from stage (d).

The invention relates also to an apparatus for carrying out the heretofore described method, this comprises apparatus in combination:

a mixture/scourer unit for washing and desorbing the solid products containing hydrocarbons with an aqueous liquid, extended by a sieving means having a first outlet for removing washed gravels and a second outlet for recovering a washed and desorbed gravel-free mixture, at least one separation unit, having an inlet orifice connected to the second outlet of said sieving means that delivers through a first outlet orifice an overflow which comprises at least the major part of the hydrocarbons and that delivers through a second outlet orifice, an underflow which comprises at least the major part of the washed sand and, a decantation means connected to the first outlet orifice of said separation unit to decant the overlow and recover on the one hand supernatant, flocculated hydrocarbons and on an other and, the aqueous liquid phase.

Finally, the invention relates to a composition for desorbing solid products containing hydrocarbons, the composition consisting of 71 to 99.9% water, 0.05% to 17% hydrocarbon solvent, 0.03 to 8% of an oxyalkylated amine or diamine surfactant and 0.02 to 16% of an alkali material.

BRIEF DESCRIPTION OF THE DRAWING

The invention will be better understood by referring to the accompanying drawing illustrating the method and its application and the following detailed description.

According to the invention, the contaminated sand is introduced continuously by means of a conveyor belt 1 or any other system for elevating materials continuously, at one extremity of a washing and desorption unit comprising a scourer/mixer unit 2 which can be a cylinder rotating about its horizontal axis and provided with vanes fixed to its inner wall for mixing and advancing the contaminated material to the discharge end.

An aqueous desorbent liquid of the invention which dilutes and which at the same time washes may be fresh water, salt water (sea water for example) or a mixture of fresh and salt water. It will be understood hereinafter that hot water may also be used, if necessary with addition of a washing product or an alkali material for promoting desorption. The aqueous desorbent liquid is introduced into the mixer/scourer unit 2 via conduit 26 and mixes with the sand, in a water/sand weight ratio between 0.25 and 5, and preferably between 0.5 and 2.

The outlet end of the mixer unit 2 is provided with a sieving means 3, for example a trommel; sieving means 3 removes through a first outlet 3a from a water-sand mixture, washed gravel, whose grain size is greater than the limit value compatible with the operation of the units located downstream of the plant applying the method according to the invention; this limit is generally 25 mm.

The water-sand mixture flowing from trommel 3 through a second outlet 3b is collected in a first tank 4 in which it is diluted by the overflow aqueous phase from the hydrocyclone 9. The resulting admixture passes via conduit 20 to pump 5 from the third outlet 4a of the first tank 4 into the hydrocyclone 6 provided with a first inlet 6a.

Two hydrocyclones 6 and 9 or cyclones comprise first and second separation units which perform a so-called cycloning operation but the invention other separation means, for example centrifugation means.

The overflow stream discharged from the hydrocyclone 6 via conduit 21 comprising the water contained in the major part of the hydrocarbons desorbed from the sand as well as a small percentage of fine particles, if any, from the sand, passes through a first outlet 6b via conduit 21 into a decantation means 13, for example a vessel, at the same time as a flocculant product, facilitating the separation of the hydrocarbons from the water is admixed with the overflow stream. This flocculant product is stored in 11, and injected on line by pump 12.

The underflow stream from hydrocyclone 6 consisting of a sand-enriched water-sand mixture and the water of which contains hydrocarbons in suspension flows out through a second outlet 6c into the second tank 7 where the underflow stream is diluted with a pair of the deoiled water, recycled from tank 13 by 14 via conduits 25a and 25b and by the drainage liquid from the vibrating sieve 10 which is placed under cyclone 9. Cyclone 9 is supplied from tank 7 of which a fourth outlet 7a is connected to the second inlet 9a of cyclone 9 by means of a pump 8.

The underflow stream from the cyclone 9 flows through the fourth outlet 9c and contains water, the hydrocarbon concentration of which is very low since it has been diluted in the two cyclones 6 and 9. The underflow stream also contains the washed sand which is collected after passage through vibrating sieve 10.

The overflow stream from cyclone 9 corresponding to slightly contaminated water passes through the third outlet 9b to the first tank 4 as already indicated, by gravity.

It is advantageous to utilize the second hydrocyclone in order to improve the sediment rinsing operation.

The distribution of the circulating water in the entire system is adjusted in a manner such as to obtain a suitable water/sand ratio in the mixing cylinder described heretofore as well as a water/sand ratio in each cyclone of between 2 and 15, and preferably between 3 and 8.

The supernatant hydrocarbons removed from the said are recovered from the surface of tank 13 by a weir or any mechanical skimming system. Flocks which are more dense and which may have formed are removed through a valve at the bottom of tank 13.

The part of the water from tank 13 which does not pass into the second tank 7 as indicated above can be recycled as the water feed for the mixing cylinder after having been mixed with the make-up water in tank 15.

Tanks 4 and 7 are fitted with a overflow means enabling the supernatant hydrocarbons which may separated to be discharged.

When the hydrocarbons to be removed from the sand are very viscous or when for various reasons the adsorption of hydrocarbons by the sand has been exacerbated, for example, by ageing processes in the air, it may be necessary to perform the washing operation at a temperature higher than the ambient temperature, this temperature, however, remaining at the most at about 80° C. for economic reasons. In that case the water is pumped by pump 16 from tank 15 to washing and mixing cylinder 2 by first passing through a heat exchanger 17 which, for example, can be a plate heat exchanger supplied with steam generated by a boiler.

According to an advantageous mode of embodiment of the method, shown by the broken line in the drawings, in the case of treatment of relatively homogeneous sand charges, or when water-sand separation is easily effected (which is the case, for example, of a freshly contaminated sand), the use of cyclone 6 is optional. In that case the overflow from hydrocyclone 9 passes through the third outlet 9b into the decantation tank 13, cyclone 9 being charged at the level of the second inlet 9a by conduit 20a leading from the first tank 4. The mixture flowing from trommel 3 is diluted in tank 4 with the purified water from tank 13 and the drainage liquid from the vibrating sieve 10.

The general solution of the problem raised comprises the utilisation of an inlet orifice as well as of a first and a second outlet orifice in the separation unit. In the case when two cyclones are used it should therefore be noted that the first inlet 6a corresponds to the inlet orifice and the first outlet 6b, then the fourth outlet 9c corresponds respectively, to the first and second outlet orifice. On the other hand, when only a single hydrocyclone 9 is used, it is respectively the third outlet 9b and fourth outlet 9c which are equivalent to the first and second outlet orifices; whereas the second inlet 9a corresponds to the inlet orifice.

The application of the method such as is described above makes it possible to treat effectively sand which has been freshly contaminated by hydrocarbons of relatively low viscosity, in practice less than about 1000 mPa.s. In the case of sands contaminated by more viscous hydrocarbons, or when the contaminated sand has been subjected for several days to ageing processes in the air, the efficiency of the method is improved by the utilisation of a desorbent liquid phase comprising at least one washing product introduced through the inlet of the mixing cylinder 2 with water derived from tank 15 from tank 18 by means of a metering pump 19.

In the case where a washing product is used, the proportion of the latter with respect to the sand is between 0.5 and 5% by weight, and preferably between 1 and 3% by weight.

According to the invention, the composition of the washing product comprises a mixture of one or several surfactants and a solvent miscible with the hydrocarbons to be removed from the sand, the proportion of the surfactant(s) in the mixture being between 3 and 50% by weight, a value of between 10 and 30% generally being efficient and economically acceptable. The proportion of the solvent in the washing product may then reach 50 to 97%.

It has been found to be advantageous to select the surfactant(s) from among oxyalkylated amine or fatty amine derivatives respectively of the following formula:

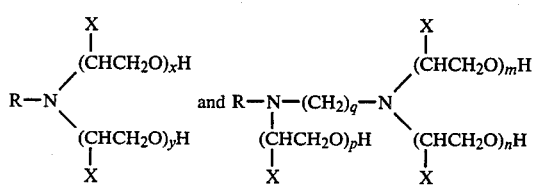

in which X is a hydrogen atom and/or a methyl radical, R a linear aliphatic chain comprising 12 to 22 carbon atoms; each of the sums $(x+y)$ and $(m+n+p)$ varies between 2 and 15, and q varies between 2 and 6.

The surfactants used according to this invention are ethoxylated derivatives (X being a hydrogen atom) of pure amines or diamines or mixtures of amines or diamines whose fatty chain comprises various numbers of carbon atoms.

As examples may be cited ethoxylated derivatives of laurylamine, oleylamine, N-laurylpropylenediamine, N-olepropylenediamine, mixtures made from vegetable or animal oils, such as copra, rapeseed or lard; the linear fatty chains may be partially or completely hydrogenated.

The solvent which can be used alone or mixed with surfactants constituting the washing product is a mixture of hydrocarbons including for example a petroleum distillation cut whose initial distillation point is at least 150° C. and the final point at least 300° C. (for example, a kerosene 200°-250° C.). Since the aromatic hydrocarbon cuts are not an essential parameter from the point of view of washing efficiency, it is recommended to use a cut with a small aromatic content to limit the toxicity due to traces of solvent remaining in the sand, if the latter is replaced on the beach after washing.

It has also been discovered that it is advantageous to add to the desorbent liquid phase, in addition to the washing product, an alkali material to alter the pH of the mixture. It can be introduced for example with the sand on the conveyor belt 1, at a dose ranging from 0.1 to 5% by weight, preferably 1 to 3%, with respect to the sand. An alkali material such as sodium carbonate can be used advantageously.

The invention is illustrated by the following examples:

EXAMPLE 1

An installation, conforming to the description given above and shown schematically in the drawings whose various parts are sized for the continuous treatment of 400 kg/h of beach sand of grain size between 0.1 and 10 mm, containing 5% of water freshly contaminated by a light petroleum residue (60 mPa.s at 20° C.) at a rate of 27 g/kg of sand.

The average residence time of the sand in the mixing cylinder, which rotates about its axis at 16 rpm was 9 min.

The cylinder was fed with fresh water at 22° C. at a flowrate of 280 l/h of which a part was recycled water from the decantation tank.

The two hydrocyclones operated at a water/sand weight ratio of 3.5.

The sand leaving the installation contained only 0.8 g of hydrocarbons per kg of sand, i.e. a washing efficiency of about 97%.

EXAMPLE 2

The same installation as that in example 1 was used under the same operating conditions to treat sand with the same characteristics containing 4.5% of water freshly contaminated by heavy fuel oil (8000 mPa.s at 20° C.) at a rate of 25 g/kg of sand.

The same leaving the installation contained 16 g of fuel oil per kg, i.e. a washing efficiency of 36%.

EXAMPLE 3

The test in example 2 was repeated, but the water introduced was heated to 50° C. in the mixing tube.

The sand leaving the installation contained 9 g of fuel oil per kg of sand, i.e. a washing efficiency of 64%.

This example shows the interest in performing the washing operation at a higher temperature.

EXAMPLE 4

The same installation as that in example 1 was used under operating conditions identical with those in example 3 to treat a batch of said identical with that in example 3, but which had been left in the air in a 1 cm layer for 10 days.

The sand leaving the installation contained 17 g of fuel oil per kg of sand, i.e. a washing efficiency of 32%.

EXAMPLE 5

The test in example 4 was repeated, introducing into the mixing tube at the same time as the water a washing composition at a flow-rate of 8 l/h, consisting of a mixture of 80% by weight of a petroleum cut corresponding to kerosene and 20% by weight of ethoxylated copra amines containing on the average 5 moles of ethylene oxide per mole of amine.

The sand leaving the installation contained 3.2 g of fuel oil per kg of sand, i.e. a washing efficiency of 87.2%.

EXAMPLE 6

The example in 5 was repeated introducing into the mixing tube with the sand sodium carbonate powder at a rate of 3 kg/h.

The sand leaving the installation contained 1.9 g of fuel oil per kg, i.e. a washing efficiency of 92.4%.

EXAMPLE 7

Example 3 was repeated using the washing formulation of example 5.

The sand leaving the installation contained 2.25 g of fuel oil per kg of sand, i.e. a washing efficiency of 91%.

Examples 5, 6, 7 and 8 show the advantage of using a washing formulation according to the invention to treat contaminated sand which has been subjected to an ageing process.

EXAMPLE 8

Example 7 was repeated introducing into the mixing tube with the sand powdered sodium carbonate at a rate of 2.5 kg/l.

The sand leaving the installation contained 1 g of heavy fuel oil per kg of sand, i.e. a washing efficiency of 96%.

The method and apparatus according to the invention thereby described are intended to treat, for example, 20 to 30 tons/hour of contaminated sediments.

We claim:

1. A method for separating hydrocarbons from a mixture comprising sand, gravel, and hydrocarbons, said method comprising:
   (a) contacting said mixture with an aqueous desorbent present in an amount between 0.5–5 wt% inclusive with respect to said sand, said aqueous desorbent comprising:
       (1) water;
       (2) 3–50 wt% with respect to said desorbent of a surfactant selected from group consisting of the following general formulae:

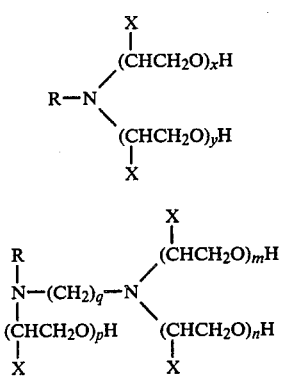

wherein:
   R is a linear aliphatic of 12–22 carbons,
   $(x+y) = 2-15$,
   $(m+n+p) = 2-15$,
   $q = 2-6$, and
   X is hydrogen or methyl; and
       (3) 50–97% wt with respect to said desorbent of a solvent for said hydrocarbon;
   and 0.15 wt% with respect to said sand of a caustic material so as to alter basicity of the resulting mixture and form an aqueous phase, a desorbed hydrocarbon phasse, and a washed sand and gravel phase;
   (b) removing gravel from said sand and gravel phase leaving a washed sand product;
   (c) separating said said product from adhering water and hydrocarbons by at least one cyclone separation with a water/sand weight ratio between 2–15 so as to form an overflow stream comprising said hydrocarbons and an underflow comprising said sand; and
   (d) separating said overflow stream by decantation to recover said hydrocarbons in an overflow stream from residual sand in an underflow stream.

2. A method according to claim 1, wherein the underflow stream from stage (c) is subject to a second cyclone separation by cycloning to produce a second overflow stream and a second underflow stream, the second overflow stream is collected and re-introduced with the mixture resulting from stage (b); the second underflow stream from which the washed sand and a de-oiled aqueous phase are recovered, is added to the underflow stream from stage (c).

3. A method according to claim 1, wherein the mixture resulting from stage (b) is passed into a first tank in which the mixture is diluted with at least a part of the underflow stream from stage (c) and/or by at least a part of the aqueous liquid phase from stage (b).

4. A method according to claim 2, wherein the underflow stream from stage (c) passes into a second tank where the stream is diluted by at least a part of the de-oiled aqueous phase from the second underflow and/or by at least a part of the aqueous liquid phase from stage (d).

5. A method according to claim 1, wherein a flocculant product is added to the overflow stream from stage (c) to facilitate separation of the stream into hydrocarbons and water.

6. A method according to claim 1, wherein said aqueous desorbent liquid is used in a weight ratio of 0.25 to 5 with respect to the sand.

7. A method according to claim 1, wherein the aqueous liquid phase resulting from stage (d) is re-introduced at least partly into stage (a) with fresh or salt make-up water comprising said aqueous desorbent liquid.

8. A method according to claim 1, wherein said aqueous desorbent liquid comprises water heated to a temperature of at most 80° C.

9. A method according to claim 1, wherein the alkali material is sodium carbonate.

10. A method according to claim 1, wherein said oxyalkylated amine or diamine derivative comprises an ethoxylated compound.

11. A method according to claim 1, wherein said hydrocarbon solvent comprises a petroleum distillation cut having an initial distillation point that is at least 150° C. and a final point of at most 300° C.

* * * * *